United States Patent [19]
Ko

[11] Patent Number: 5,838,852
[45] Date of Patent: *Nov. 17, 1998

[54] ADJUSTABLE OPTICAL POWER LIMITER

[76] Inventor: Chun-Ming Ko, 5326 Glenwood Way, El Sobrante, Calif. 94803

[*] Notice: This patent issued on a continued prosecution application filed under 37 CFR 1.53(d), and is subject to the twenty year patent term provisions of 35 U.S.C. 154(a)(2).

[21] Appl. No.: 789,855

[22] Filed: Jan. 28, 1997

[51] Int. Cl.[6] ................................................ G02B 6/32
[52] U.S. Cl. ............................ 385/34; 385/16; 385/23; 385/33
[58] Field of Search ....................... 385/34, 15–23, 385/33–38, 26, 74

[56] References Cited

U.S. PATENT DOCUMENTS

| | | | |
|---|---|---|---|
| 4,239,330 | 12/1980 | Ashkin et al. | 385/22 |
| 4,398,806 | 8/1983 | Bennett et al. | 350/394 |
| 4,516,827 | 5/1985 | Lance et al. | 350/96.15 |
| 4,530,600 | 7/1985 | Lopez | 356/5 |
| 4,925,273 | 5/1990 | Maisenbacher et al. | 350/315 |
| 4,989,938 | 2/1991 | Tamulevich | 350/96.15 |
| 5,011,265 | 4/1991 | Tamamura et al. | 350/173 |
| 5,066,094 | 11/1991 | Takahashi | 385/73 |
| 5,087,122 | 2/1992 | Ostrander et al. | 356/73.1 |
| 5,136,681 | 8/1992 | Takahashi | 385/40 |
| 5,226,104 | 7/1993 | Unterleitner et al. | 385/140 |
| 5,325,459 | 6/1994 | Schmidt | 385/140 |
| 5,420,946 | 5/1995 | Tsai | 385/22 |
| 5,477,376 | 12/1995 | Iwatsuka et al. | 359/283 |
| 5,611,009 | 3/1997 | Pan | 385/22 |

*Primary Examiner*—Phan T. H. Palmer
*Attorney, Agent, or Firm*—Lyon & Lyon LLP

[57] ABSTRACT

An adjustable optical power limiter wherein an output optical fiber having a one-quarter pitch of Grade Index Refractive (GRIN) lens is rotated about its axis to produce incremental and varying insertion losses. An input optical fiber having a GRIN lens is optically aligned with the output fiber so that a minimum amount of insertion loss is produced in the output fiber when the output fiber is in a nominal or zero rotational position. A controller in conjunction with a step motor can incrementally rotate the output fiber from the nominal position to optically misalign the input fiber from the output fiber. In this manner, the adjustable optical power limiter can incrementally produce insertion losses in the output fiber, thereby limiting the optical output power.

21 Claims, 7 Drawing Sheets

FIG. 7

ADJUSTABLE OPTICAL POWER LIMITER

BACKGROUND OF THE INVENTION

1. Field of the Invention

This invention relates generally to fiber optics, and more particularly concerns an adjustable optical power limiter.

2. Description of the Prior Art

In certain applications, it is desirable to limit the optical power that is transmitted from a specific optical fiber. In just one example, the optical outputs of an optical de-multiplexer will have differing optical power values. The reason for this is that the insertion losses produced by the filters within the de-multiplexer are wavelength dependent, and hence, the difference in wavelengths of each signal in the output ports of the de-multiplexer causes a power variance between the signals. It would be desirable for signals in each of the output ports of the optical de-multiplexer to have the same optical power level before these signals are amplified or sent to other devices. To equalize the power of the signals in each of the output ports of the de-multiplexer, an adjustable optical power limiter is required.

At junctions between active components such as optical power limiters and the remainder of the optical network, the use of bare fiber can reduce performance by increasing insertion losses. This is caused by the difficulty in optically aligning the small diameters of the cores of the optical fibers. A misalignment of a few micrometers can cause large insertion losses and unstable optical signals. This is especially true when using single-mode fiber.

Figure 1:
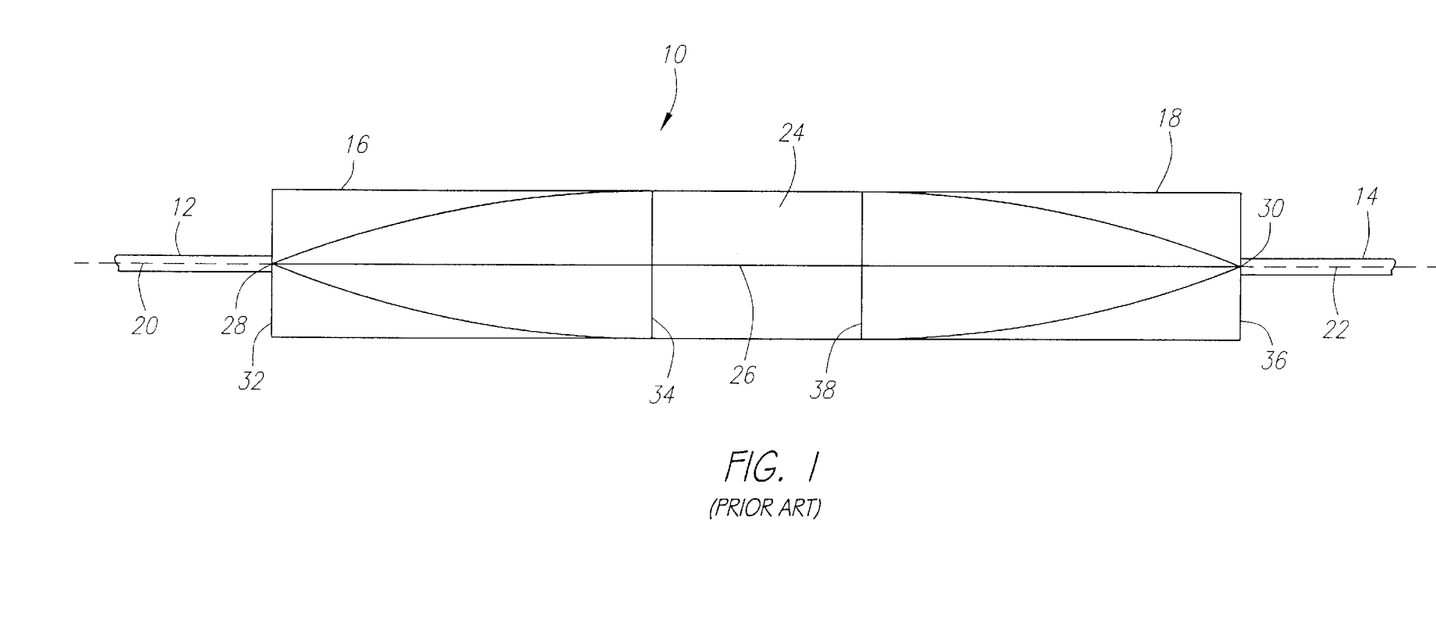
FIG. 1 is a schematic view of a prior art optical collimator assembly.

This misalignment problem has been addressed to some extent in the prior art through the use of a collimator assembly 10, which is shown in FIG. 1. Collimator assembly 10 comprises optical fibers 12 and 14 having respective axes 20 and 22. Placed between fiber 12 and 14 are respective 0.25 pitch Grade Refractive Index (GRIN) lenses 16 and 18. GRIN lenses 16 and 18 collimate an optical signal 24 traveling between fibers 12 and 14 to produce a parallel and focused beam. In addition, GRIN lenses 16 and 18 make fibers 12 and 14 act as if their respective core diameters have been enlarged to the diameters of GRIN lenses 16 and 18. That is, for alignment purposes the core diameters of fibers 12 and 14 are effectively enlarged ten to one-hundred times their actual size. As a result, insertion losses will be minimized when there is an optical misalignment between fibers 12 and 14.

The fibers 12 and 14 are optically aligned (i.e., an optical signal output from fiber 12 will be focused on the core of fiber 14, and vice versa) when the respective axes 20 and 22 of fibers 12 and 14 are mechanically aligned. In particular, the optical axis 26 of the optical signal 24 output from fiber 12 is collinear with the axis 20 of fiber 12 since the respective ends 28 and 30 of fibers 12 and 14 and the respective ends 32, 34, 36, and 38 of GRIN lenses 16 and 18 are polished flat (i.e., the surfaces of the ends are perpendicular to mechanical axis 20). Therefore, the axis 22 of fiber 14 need only be mechanically aligned with the axis 20 of fiber 12 for fibers 12 and 14 to be optically aligned with one another. Although some misalignment between mechanical axes 20 and 22 is inevitable due to mechanical tolerances, for illustrative purposes, FIG. 1 depicts the axes 20 and 22 as being aligned.

Figure 2:
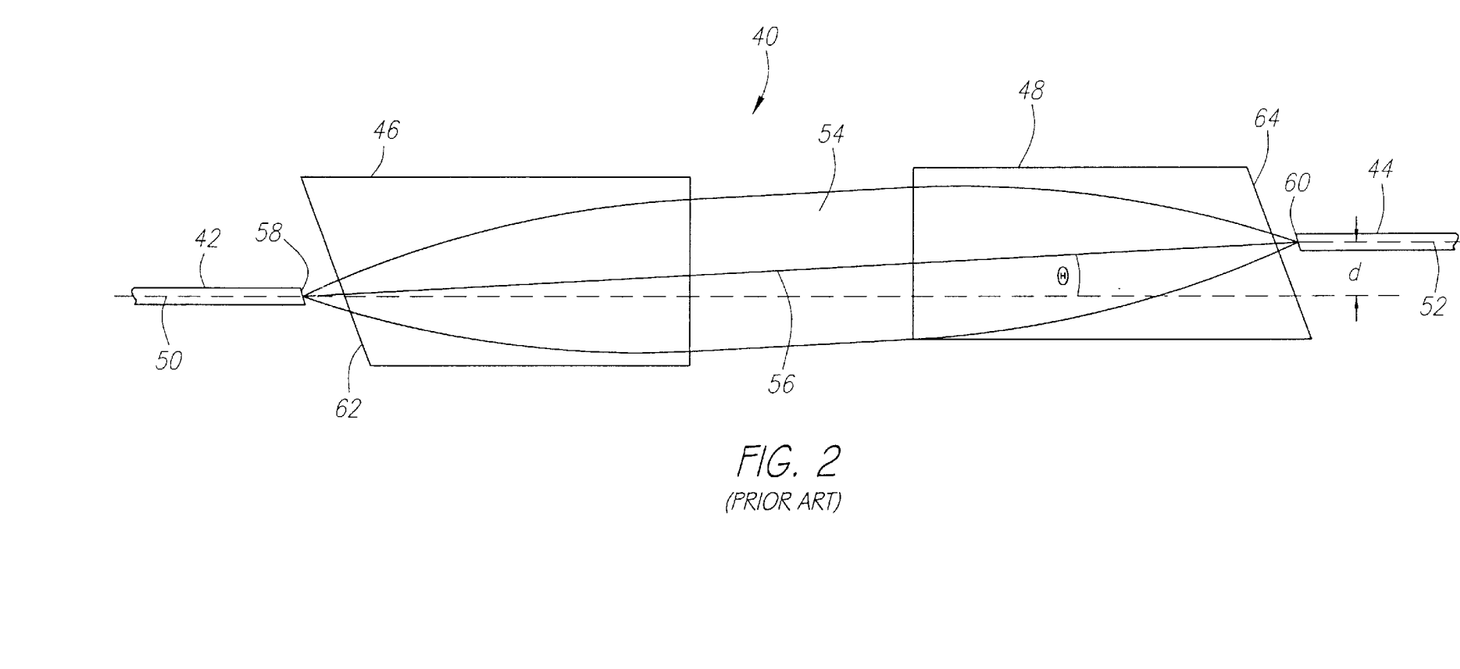
FIG. 2 is a schematic view of a prior art optical collimator assembly having reduced return loss.

A collimator assembly 40, which reduces return loss (i.e., the ratio of reflected power to incident power), is depicted in FIG. 2. Collimator assembly 40 comprises optical fibers 42 and 44 having respective axes 50 and 52. Respective GRIN lenses 46 and 48 are placed at respective ends 58 and 60 of fibers 42 and 44. Respective ends 58 and 60 of fibers 42 and 44 and respective ends 62 and 64 of GRIN lenses 46 and 48 are polished at an angle to prevent reflected portions of the optical signal from traveling back and forth between the fibers 42 and 44 and the respective GRIN lenses 46 and 48, thereby reducing the return loss. Because the respective ends 58 and 60 of fibers 42 and 44 and the respective ends 62 and 64 of GRIN lenses 46 and 48 are polished at an angle, an optical axis 56 of the optical signal 54 output from fiber 42 is not collinear with the axis 50 of fiber 42. Instead, an offset angle($\theta$) is created between the optical axis 56 and the axis 50 of fiber 42. To compensate for the offset angle created by the optical axis 56, GRIN lens 48 and the axis 52 of fiber 44 are offset from the axis 50 of fiber 44 a distance (d) so that fibers 42 and 44 are optically aligned with each other. Due to polishing angle tolerances, almost every collimator assembly has a different offset angle($\theta$).

SUMMARY OF THE INVENTION

The present invention limits the optical transmission power by using a rotatable GRIN lens and optical fiber.

An adjustable optical power limiter of the present invention comprises first and second optical fibers with respective first and second GRIN lenses placed between them. Ends of the respective fibers and GRIN lenses are polished at an angle to reduce return loss. As a result, an offset angle between an optical axis of an optical signal output from the first fiber and an axis of the first fiber is created. An axis of the second fiber and the second GRIN lens are mechanically offset from the axis of the first fiber to compensate for this offset angle, so that the first and second fibers are optically aligned with each other, thereby minimizing the insertion loss.

The first fiber and first GRIN lens are rotatable and can be axially rotated from its nominal rotational position (i.e., the rotational position for which the first and second fiber are optically aligned with each other to obtain the minimum insertion loss) so that the offset angle can be varied. As the first fiber is incrementally rotated away from its nominal rotational position, the first and second fibers become more optically misaligned, thereby incrementally increasing the insertion loss. In this manner, a controller can control a motor that rotates the first fiber so that the desired insertion loss can be obtained.

The above and other features of the invention, including various novel details of construction and combination of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the free spirit of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Figure 3:
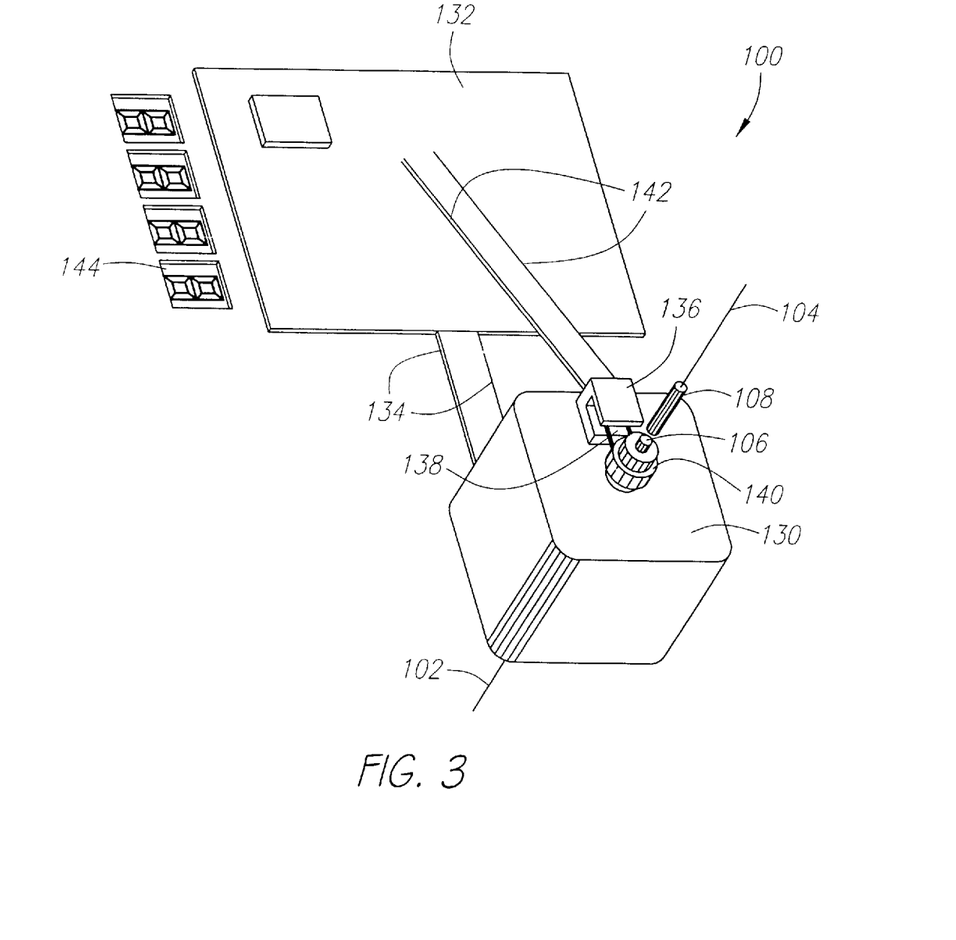
FIG. 3 is a perspective view of an adjustable optical power limiter made in accordance with the aspects of the present invention.
Figure 4:
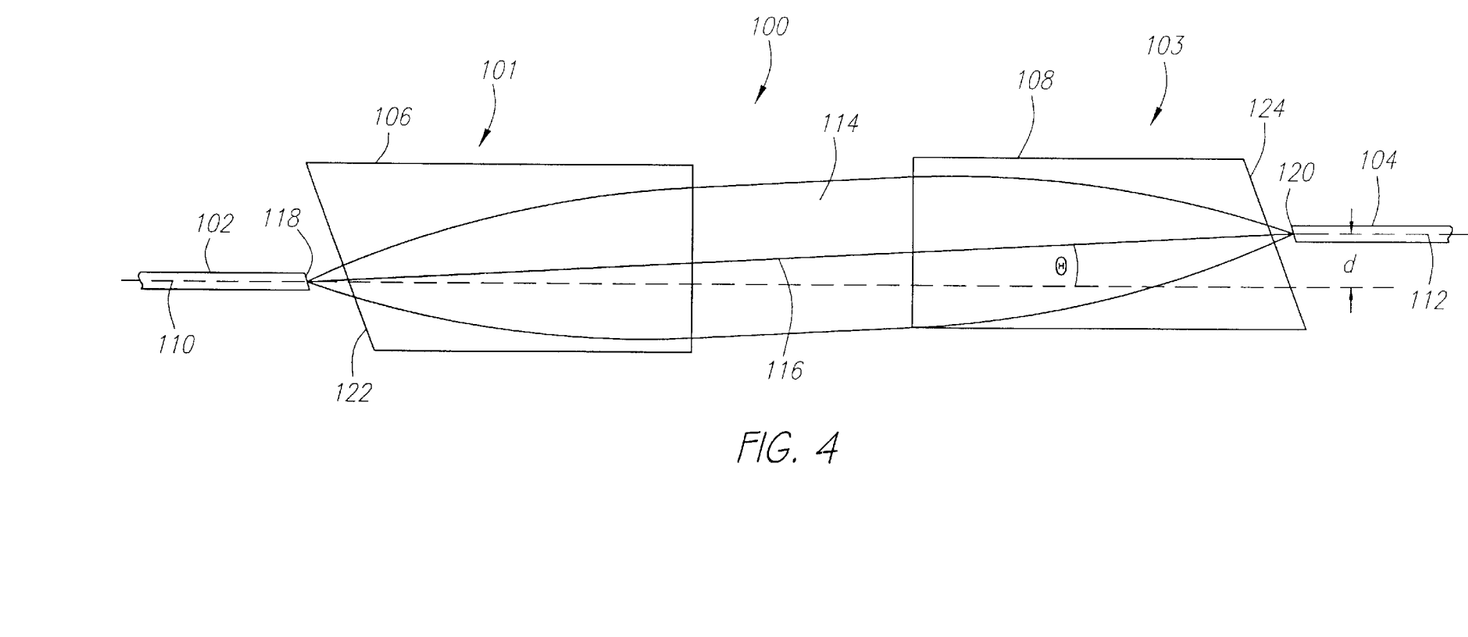
FIG. 4 is a schematic view of an optical collimator assembly of the adjustable optical power limiter shown in FIG. 3 having a first optical fiber in its nominal rotational position.

Referring to the drawings, and in particular FIG. 3, there is shown a first embodiment of an adjustable optical power limiter 100 incorporating aspects of the invention. As seen in FIG. 4, the power limiter 100 comprises first and second collimators 101 and 103, respectively, which are parallel and laterally fixed in relation to each other (i.e., the distance between the first collimator 101 and the second collimator 103 is fixed). The first collimator 101 and the second collimator 103 need not be collinear, however. First collimator 101 comprises a first optical fiber 102 with a first GRIN lens 106. Second collimator 103 comprises a second optical fiber 104 with a second GRIN lens 108.

As illustrated in FIG. 4, respective ends 118 and 120 of first fiber 102 and second fiber 104, and respective ends 122 and 124 of first GRIN lens 106 and second GRIN lens 108 are polished at an angle to reduce return loss. The angles that ends 118, 120, 122, and 124 are polished may vary. However, because the power limiter 100 will be calibrated, as described below, the angles need not be known. The method of polishing ends 118, 120, 122, and 124 are known in the art. Because ends 118, 120, 122, and 124 are at angles with respect to the axis 110 of the first collimator 101, an offset angle($\theta$) is created between an optical axis 116 of an optical signal 114 output from the first fiber 102 and an axis 110 of the first collimator 101.

For purposes of clarity in illustration, the optical axis 116 is shown as a straight line. In reality, the optical axis 116 is formed as a series of lines with different offset angles that are joined together at each medium transition. The important feature of the invention, however, is that the optical axis 116 is offset from the axis 110 of the first collimator 101 as the optical signal 114 enters the second fiber 104. To compensate for the offset angle of the optical axis 116, an axis 112 of the second collimator 103 is offset from the axis 110 of the first collimator 101 a distance (d) to optically align the first fiber 102 and the second fiber 104 with each other, thereby minimizing the insertion loss. Distance (d) can be located using techniques known in the art, such as measuring the power of the optical signal 114 output from the second fiber 104 and physically adjusting the location of the end 120 of the second fiber 104 until the minimum insertion loss is achieved.

Figure 5:
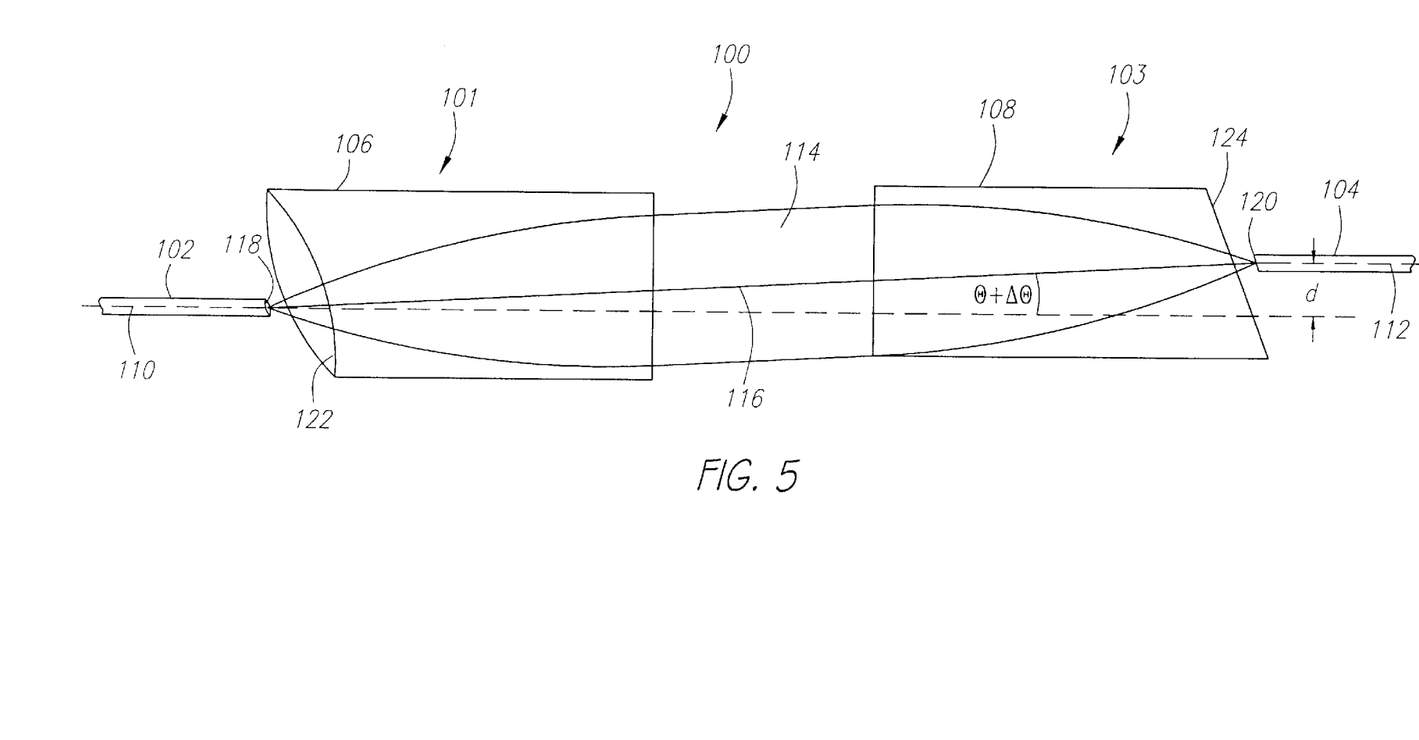
FIG. 5 is a schematic view of an optical collimator assembly of the adjustable optical power limiter shown in FIG. 3 having a first optical fiber rotated from its nominal rotational position.

Referring to FIG. 3, the first collimator 101 is inserted into a hollow rotatable shaft (not shown) of a step motor 130, thereby allowing the first collimator 101 to rotate about its axis 110. As depicted in FIG. 5, as the first collimator 101 is axially rotated from its nominal rotational position, an offset angle ($\theta+\Delta\theta$) between the optical axis 116 and the axis 110 of the first collimator 101 is created. The nominal rotational position is the rotational position in which the second collimator 103 is adjusted to optically align the first fiber 102 and second fiber 104 with each other to obtain the minimum insertion loss. Since the first collimator 101 and the second collimator 103 are laterally fixed with respect to each other, the first fiber 102 and second fiber 104 become optically misaligned with each other when the first collimator 101 is axially rotated. This optical misalignment causes the optical signal 114 to be defocused from the core of the second fiber 104, thus increasing the insertion loss.

Figure 6:
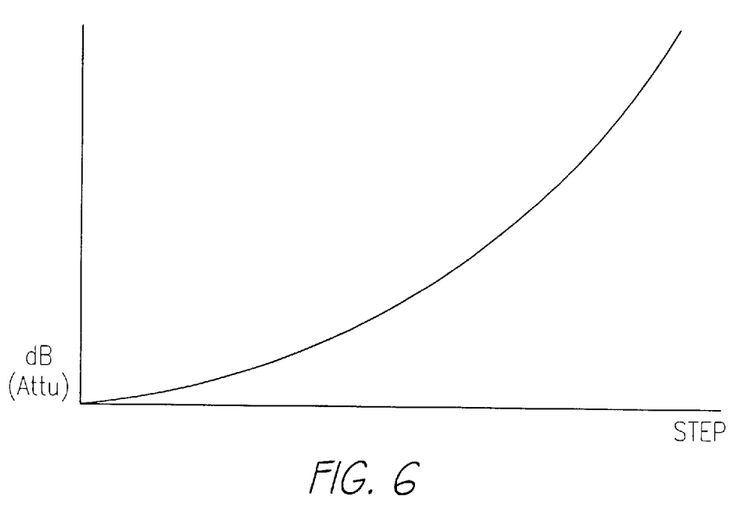
FIG. 6 is a graph showing generally the insertion loss versus the rotational position of the adjustable optical power limiter shown in FIG. 3.

The amount of insertion loss depends on the rotational position of the first collimator 101. In general, as the first collimator 101 is rotated from its nominal rotational position, the insertion loss exponentially increases, as shown in FIG. 6.

Referring to FIG. 3, a controller 132 controls the movement of the step motor 130 via control wires 134. As described further below, the power limiter 100 is calibrated to produce a rotational position-insertion loss table, which can be stored in the memory of the controller 132. The rotational position-insertion loss table comprises the incremental insertion losses produced by the power limiter 100 and the corresponding rotational positions of the first collimator 101. An optical interrupter 136 in conjunction with a zero position plate 138 aids the controller 132 in determining the rotation position of the first collimator 101. The optical interrupter 136 is mounted to the motor 130 such that its in a fixed position relative to the hollow rotatable shaft (not shown) of the motor 130. The zero position plate 138 forms an integral unit with a sleeve 140 that is disposed around the hollow rotatable shaft of the step motor 130 such that the sleeve 140 and zero position plate 138 rotate with the hollow rotatable shaft. Feed back wires 142 provide nominal or zero rotational position feedback to the controller 132. The structure and method of using the optical interrupter 136 and zero position plate 138 are described in U.S. Pat. No. 5,420,946, which is hereby incorporated by reference in its entirety. The controller 132 preferably includes a numerical or LCD display 144 which will show the immediate insertion loss produced by the power limiter 100.

In this manner, an operator can use the controller 132 to change the rotational position of the first collimator 101 so that a desired insertion loss is produced. For example, if an insertion loss of 1.0 db is desired, the operator can input this information into the controller 132. Using the rotational position-insertion loss table, the controller 132 can send a signal through control wires 134 to the motor 130 to rotate the first collimator 101 to the rotational position that will produce an insertion loss of 1.0 db.

It should be noted that because the optical signal 114 is bidirectional, the optical signal 114 output from the second fiber 104 will create the same amount of misalignment between fiber 102 and fiber 104 as that of the optical signal 114 output from the first fiber 102. Thus, the optical limiter 100 will produce the same insertion loss regardless of whether the respective first fiber 102 and second fiber 104 are input and output fibers or, conversely, output and input fibers.

Figure 7:
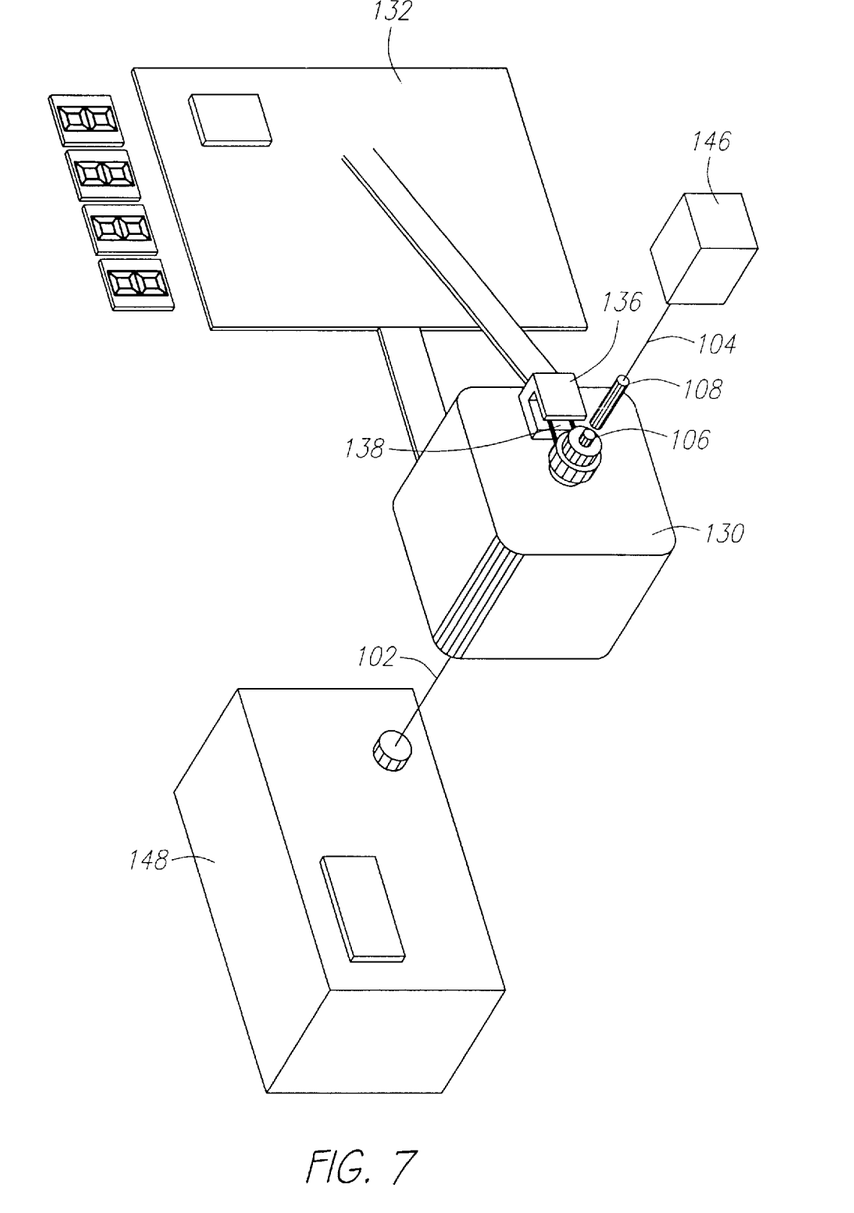
FIG. 7 is a calibration setup for the adjustable optical power limiter shown in FIG. 3.

The rotational position-insertion loss table that is programmed into the controller 132 can be developed by calibrating the power limiter 100 as follows. Referring to FIG. 7, the second fiber 104 is connected to an optical signal source 146, and the first fiber 102 is connected to an optical power meter 148. Using the optical interrupter 136 and the zero position plate 138, the controller 132 can reset the motor to its zero position such that the first collimator 101 is in its nominal rotational position. A continuous optical signal with uniform power from the optical source 146 is input to the second fiber 104. The optical power meter 148 senses the output power level of the optical signal as it travels out of the first fiber 102. As the motor 130 is incrementally stepped, the insertion loss produced by the optical limiter 100 will change, thereby causing the output power level of the optical signal to change. By reading the optical meter 148 at each incremental step in the motor 130, a difference in insertion loss for each incremental step and the zero position step can be obtained. The insertion loss and the corresponding incremental steps can then be stored in the controller 132 for power limiting applications.

Of course, one skilled in the art will recognize that rather than have the first collimator 101 rotatable, the second collimator 103 can be rotatable. By calibrating the power limiter 100 by incrementally rotating the second collimator 103, equally satisfactory results can be obtained.

Having thus described my invention, what I claim as new and desire to secure by Letters Patent of the United States of America is:

1. An adjustable optical power limiter comprising:
   a first collimator having an optical fiber;
   a second collimator having an optical fiber, said second collimator being substantially parallel to said first collimator, such that at least a portion of an optical signal transmitted through said first collimator enters said second collimator, at least one of said first collimator and second collimator being rotatable about a longitudinal axis of said optical fiber of said at least one of said first collimator and second collimator.

2. The adjustable optical power limiter of claim 1 wherein said first collimator comprises a grade reflective (GRIN) lens and said second collimator comprises a GRIN lens, and wherein an edge of at least one of said optical fiber and said GRIN lens of said at least one rotatable collimator is polished at an angle.

3. The adjustable optical power limiter of claim 2 further comprising:
   a motor having a rotatable shaft, said rotatable shaft mechanically coupled to said at least one rotatable collimator.

4. The adjustable optical power limiter of claim 3 further comprising:
   a controller, said motor electrically connected to said controller such that said controller can incrementally rotate said rotatable shaft of said motor, said controller having a memory with a rotational position-insertion loss table stored therein.

5. The adjustable optical power limiter of claim 4 further comprising:
   an optical interrupter mounted to said motor such that said optical interrupter is fixed in relation to said rotational shaft of said motor, said optical interrupter electrically connected to said controller, such that said optical interrupter can provide zero position data to said controller; and
   a zero position plate fixably attached to said rotatable shaft of said motor such that said zero position plate rotates with said rotatable shaft of said motor.

6. The adjustable optical power limiter of claim 5 further comprising:
   an optical power source optically coupled to an input of said first collimator; and
   an optical power meter optically coupled at an output of said second collimator.

7. The adjustable optical power limiter of claim 2, wherein said first collimator and said second collimator are laterally fixed in relation to each other.

8. The adjustable optical power limiter of claim 7, wherein one of said first collimator and said second collimator is rotatably fixed.

9. The adjustable optical power limiter of claim 3, wherein said rotatable shaft is hollow, one of said at least one rotatable collimator being disposed in said hollow rotatable shaft.

10. A method of adjusting an optical signal power level, the method comprising:
    transmitting an optical signal between a first collimator having a first optical fiber and a second collimator having a second optical fiber; and
    rotating said first collimator about a longitudinal axis of said first optical fiber to adjust said optical signal power level.

11. The method of claim 10, wherein said first optical fiber includes an optical axis, the method further comprising the step of misaligning said optical axis with said longitudinal axis.

12. The method of claim 11, wherein said first collimator includes a first grade reflective index (GRIN) lens and said second collimator includes a GRIN lens, and wherein said misalignment step further comprises polishing an end of at least one of said first optical fiber and said first GRIN lens.

13. The method of claim 12, wherein said rotation step further comprises incrementally axially rotating said first collimator to produce a desired optical signal power level.

14. A method of calibrating an optical power limiter comprising a first collimator having a first optical fiber and a second collimator having a second optical fiber, the method comprising the steps:
    transmitting an optical signal between said first collimator and said second collimator;
    measuring a power level of said optical signal; and
    measuring a rotational position of said first collimator about a longitudinal axis of said first optical fiber corresponding to said measured power level.

15. The method of claim 14,
    wherein said optical signal transmission step comprising providing a uniform source of optical power at an input of one of said first optical fiber and said second optical fiber; and
    wherein said optical signal measurement step comprises measuring said optical power level at an output of another of said first optical fiber and said second optical fiber.

16. The method of claim 15;
    wherein said first collimator includes a first optical fiber and said second collimator includes a second optical fiber;
    wherein said optical signal transmission step comprises providing a uniform source of optical power at an input of one of said first optical fiber and said second optical fiber; and
    wherein said optical signal measurement step comprises measuring said optical power level at an output of another of said first optical fiber and said second optical fiber.

17. An adjustable optical power limiter comprising:
    a first collimator having an optical fiber with a grade reflective index (GRIN) lens disposed thereon;
    a second collimator having an optical fiber with a grade reflective index (GRIN) lens disposed thereon, said second collimator being substantially parallel to said first collimator, such that at least a portion of an optical signal transmitted through said first collimator enters said second collimator, at least one of said first collimator and second collimator being rotatable about a longitudinal axis of said at least one of said first collimator and second collimator;

a motor having a rotatable shaft, said rotatable shaft mechanically coupled to said at least one rotatable collimator; and wherein an edge of at least one of said optical fiber and said GRIN lens of said at least one rotatable collimator is polished at an angle.

18. The adjustable optical power limiter of claim 17 further comprising:

a controller, said motor electrically connected to said controller such that said controller can incrementally rotate said rotatable shaft of said motor, said controller having a memory with a rotational position-insertion loss table stored therein.

19. The adjustable optical power limiter of claim 18 further comprising:

an optical interrupter mounted to said motor such that said optical interrupter is fixed in relation to said rotational shaft of said motor, said optical interrupter electrically connected to said controller, such that said optical interrupter can provide zero position data to said controller, and a zero position plate fixably attached to said rotatable shaft of said motor such that said zero position plate rotates with said rotatable shaft of said motor.

20. The adjustable optical power limiter of claim 19 further comprising:

an optical power source optically coupled to an input of said first collimator; and an optical power meter optically coupled at an output of said second collimator.

21. The adjustable power limiter of claim 17, wherein said rotatable shaft is hollow, one of said at least one rotatable collimator being disposed in said hollow rotatable shaft.

* * * * *